United States Patent [19]

Nagasawa

[11] 4,274,001
[45] Jun. 16, 1981

[54] SCANNING TYPE SCINTILLATION CAMERA

[75] Inventor: Yasuo Nagasawa, Kashiwa, Japan

[73] Assignee: Hitachi Medical Corporation, Japan

[21] Appl. No.: 969,824

[22] Filed: Dec. 15, 1978

[30] Foreign Application Priority Data

Dec. 16, 1977 [JP] Japan .................. 52-150586

[51] Int. Cl.³ .................................... G01T 1/20
[52] U.S. Cl. .................................... 250/363 S
[58] Field of Search ............... 250/363 S, 368, 369

[56] References Cited

U.S. PATENT DOCUMENTS 4,010,370  3/1977  LeMay .................. 250/366

FOREIGN PATENT DOCUMENTS 2510810  9/1976  Fed. Rep. of Germany ....... 250/363 S Primary Examiner—Alfred E. Smith
Assistant Examiner—Carolyn E. Fields
Attorney, Agent, or Firm—Gerald J. Ferguson, Jr.; Joseph J. Baker

[57] ABSTRACT

The effective area of observation of a scanning-type scintillation camera is expanded relative to the actual area scanned by shifting the position of a spatial window back and forth in the direction of scanning so that the sum of the window velocity and the velocity of actual scanning represents a predetermined scanning velocity.

1 Claim, 10 Drawing Figures

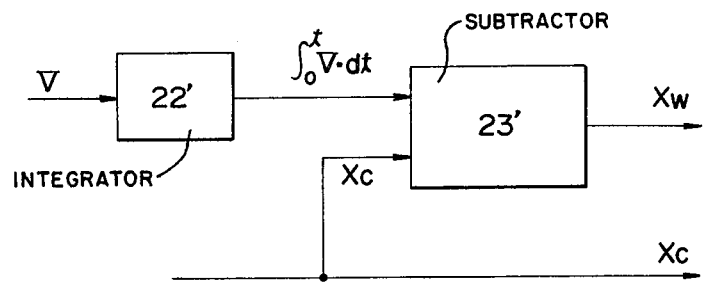
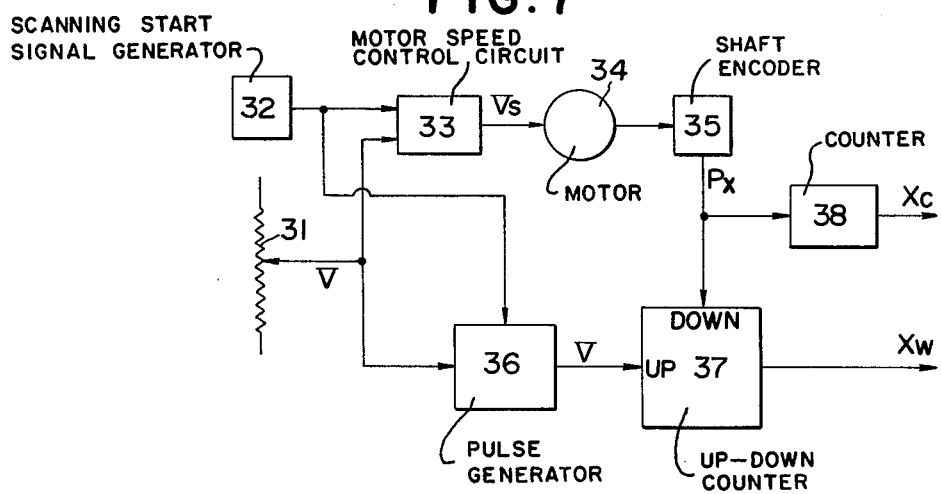

SCANNING TYPE SCINTILLATION CAMERA

BACKGROUND OF THE INVENTION (1) Field of the invention

The present invention relates to a scanning type scintillation camera, and more particularly it pertains to a scanning type scintillation camera arranged so that an effective area of observation is expanded relative to the actual area scanned by the detector.

(2) Description of the prior art

A scanning type scintillation camera, in general, is designed so that bright spots of radiation are detected while moving the detector of the camera relative to a subject under examination such as a human body, and that the positions of occurrence of bright spots noted in the coordinate system set for the electrically formulated first spatial "window" (the word "window" herein used is a technical term known in this field of technique, and will hereinafter be mentioned without such adjective as "spatial" for the sake of simplicity) of the camera are converted to coordinate system intended for imaging the whole body of the subject by adding them to or subtracting them from the distance covered by the detector, to thereby obtain a scintigram through photography. This prior art will be explained more concretely hereinbelow by referring to FIG. 1. In this Figure, reference numeral 1 represents a detector of a scintillation camera for detecting radiation. Symbols X and Y represent an X-axis and a Y-axis of a coordinate system which, herein, is orthogonal coordinate system intended for imaging the whole body under examination. The detector 1 is understood to move in the direction of the X-axis at a constant speed. 2 represents a "window" as briefed above which may be, for example, a rectangular window. Symbol a represents the width in the X-axis direction of this rectangular window. Symbol b represents the length in the Y-axis direction thereof. 1' represents a position of the detector 1 assumed at the end of its movement. Let us now assume that the detector 1 is located at a position $X_c$, $Y_c$ in the coordinate system for imaging the whole body. When the detector 1 detects the fact that radiation such as a gamma ray has impinged onto points x, y of the coordinate system set for the detection range of the scintillation camera, there are outputted coordinate signals (x, y) from the scintillation camera. These signals are added to the positional signals ($X_c$, $Y_c$) in the coordinate system of the detector intended for imaging the whole body, and the following processing by computation $$X = X_c + x$$
$$Y = Y_c + y \qquad (1)$$

is carried out, so that these signals (X, Y) will provide positional signals corresponding the bright spots of radiation in the coordinate system for imaging the whole body. Then, these positional signals (X, Y) to which said signals $X_c$, $Y_c$ have been converted are inputted to a display X, Y oscilloscope to form bright spots at positions corresponding to those positions in the coordinate system intended for imaging the whole body. This cycle of operation is repeated for each detection of gamma ray by the detector 1 as the latter moves at a constant speed. By recording these bright spots on a film, it is possible to record the distribution of radiation density of the particular area scanned by the detector 1.

The processing by computation shown in Formula (1) is carried out only for that gamma ray which has impinged within the area a×b of the window 2 of the detector 1 shown in FIG. 1. Those gamma rays which have impinged onto those areas located outside this area of the window 2 are excluded, to thereby keep the sensitivity of the scintillation camera constant.

Let us now assume that, in FIG. 1, the detector 1 starts scanning in the X-axis direction at a constant speed from a point on the X-axis and represented by $X_c = a/2$, $Y_c = 0$ (which means point P in FIG. 2), and that it has performed scanning up to a point located on the X-axis and represented by $X_c = X_E - (a/2)$ (which means point Q in FIG. 2). The time T required by the aforesaid window of the scintillation camera for the observation of the respective points located in the area scanned by the detector 1 will become as shown in FIG. 2. More particularly, the time T which is required by the window 2 having a width a in the X-axis direction to make the observation of those points located between point P' (which is represented by $X_c = a$) and point Q' (which is represented by $X_c = X_E - a$) is $T = a/V$. However, the time T which is required by the window 2 to make the observation of points located on the X-axis at positions ahead of point P' or to make the observation of points located on the X-axis at positions behind Q' will have a value smaller than a/V as shown in FIG. 2. In this Figure, the distance D from point P to point Q is $D = X_E - a$ which represents the area scanned actually by the detector 1. And, the distance from point P' to point Q', i.e. $D_{eff} = X_E - 2a$, will be the actually effective area for observation. It should be understood, however, that the above-mentioned relationship is one which is obtained in case the detector 1 scans at a constant speed the scanning distance D from point P to point Q. In actual operation, it is impossible to sharply raise the speed of movement of the detector 1 from its rest state up to its gaining a constant speed. Therefore, the difference between the distance covered by the detector 1, i.e. said area of scanning D, and the effective area of observation will become further greater.

Next, the sequential steps of forming a scintigram by the use of a conventional scanning type scintillation camera will be explained by referring to the schematic illustration in blocks shown in FIG. 3. In this Figure, 11 represents a detector of a scintillation camera. 12 represents a pedestal supporting the detector 11. 13 represents a bed of a patient or a subject under examination. 14 represents the patient. The gamma ray which has been detected by the detector 11 is transmitted to a console (operation table) 15 of the scintillation camera, whereat the detected gamma ray is subjected to computation with respect to the position of its incidence, and the computed position of the gamma ray is outputted as positional signals (x, y) in the coordinate system which uses the center of the detector as the point of origin. 16 represents a scanning speed control circuit for controlling the scanning speed of the scintillation camera. Here, in order to simplify the explanation, the direction of movement of the detector 11 is assumed to be the x-axis direction of the x, y corrdinate system of the detector. 17 represents a window circuit which outputs only those input signals, among the coordinate signals x, y which are outputted from the console 15, which enter in the region represented by $|x| < (a/2)$ and $|y| < (b/2)$. 18 represents a coordinate conversion circuit which receives, as its inputs, positional signals $X_c$, $Y_c$ of the detector in the whole body imaging coordinate system outputted from a mechanism not shown for reading the position of the detector and also signals x, y outputted from the window circuit 17 and which outputs coordinate conversion signals X, Y which are obtained through the computation $X=X_c+x$, $Y=Y_c+y$. 19 represents a limiter circuit which is intended to preclude those data locating outside the effective obervation area $D_{eff}$(the area from point P' to point Q' in FIG. 2), since they cannot be used as imaging data. The output from this limiter circuit 19 is inputted to an X, Y oscilloscope 20 to thereby form a bright spot at a site corresponding to the position of the incident gamma ray, and thus a scintigram is recorded on the film of the camera 21.

As will be understood from the foregoing description, let us now suppose that a scanning has been performed at a constant speed from point P represented by $X_c=(a/2)$ up to point Q represented by $X_c=X_E-(a/2)$. Then, it will be understood that the respective positions falling within the effective observation area $D_{eff}$ represented by $a \leq X_c \leq X_E-a$ are observed by the detector only for the length of time $T=a/V$ which is determined by the width a of the window and the constant velocity V. With respect to those positions locating in the area represented by $0<X_c<a$ (meaning the area ahead of point P') and those positions locating in the area represented by $X_E-a<X_c<X_E$ (meaning the area locating behind point Q'), their observation time T will become smaller than the aforesaid $T=a/V$ because of the fact that the entire width a of the window does not pass them. Thus, those latter two groups of positions cannot be utilized as observation data. It is the role of the limiter circuit 19 to preclude the data concerning these two kinds of areas. As will be understood from the foregoing description, an effective observation area $D_{eff}$ is smaller by the width a of the window than the distance D actually covered by the detector.

SUMMARY OF THE INVENTION

It is, therefore, the object of the present invention to provide a scanning type scintillation camera which is capable of expanding an effective observation area further than the actually covered distance of the detector, and which does not need a sharp rise in the scanning speed of the detector.

BRIEF DESCRIPTION OF THE DRAWINGS

FIGS. 6 and 7 are block diagrams for showing examples of means for shifting the position of the window in the scintillation camera of the present invention.

DETAILED DESCRIPTION OF THE PREFERRED EMBODIMENTS

Figure 1:
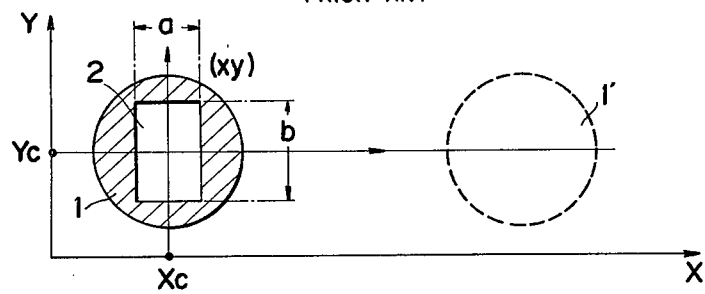
FIG. 1 is an explanatory illustration of a known scanning type scintillation camera.
Figure 2:
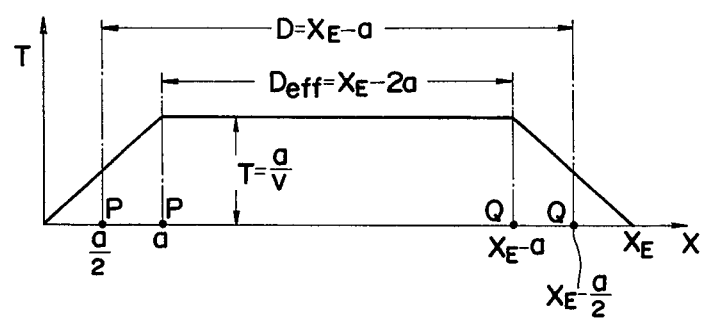
FIG. 2 is a chart for explaining the relationship between a movement of the detector and the time of observation.
Figure 3:
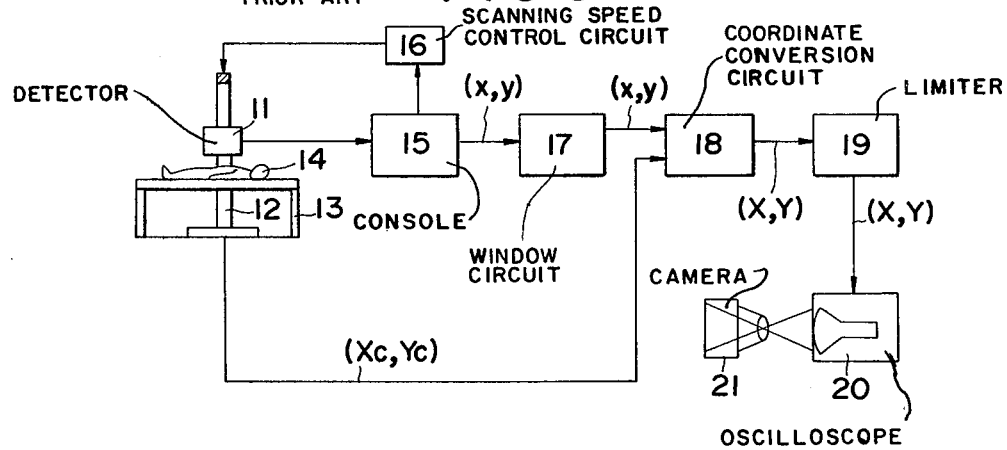
FIG. 3 is an explanatory block diagram for showing the arrangement of a known scanning type scintillation camera.

In FIG. 3, 11 represents a radiation detector in a scintillation camera. 12 represents a pedestal for supporting the detector 11. 13 represents a bed for a patient, i.e. a subject under examination. 14 represents a patient. The gamma ray which has been detected by the detector 11 is transmitted to a console (operation table) 15 of the scintillation camera, whereat the detected gamma ray is subjected to computation with respect to the position of its incidence, and is outputted as positional signals (x, y) in the coordinate system which uses the center of the detector as the point of origin. 16 represents a scanning speed control circuit for controlling the scanning speed of the scintillation camera. Here, in order to simplify the explanation, the direction of movement of the detector 11 is assumed to be the x-axis direction of the x, y coordinate system of the detector. 17 represents a window circuit which outputs only those input signals, among the coordinate signals x, y which are outputted from the console 15, which enter in the region represented by $|x|<(a/2)$ and $|y|<(b/2)$. 18 represents a coordinate conversion circuit which receives, as its inputs, positional signals $X_c$, $Y_c$ of the detector in the whole body imaging coordinate system outputted from a mechanism not shown for reading the position of the detector and also signals x, y outputted from the window circuit 17 and which outputs coordinate conversion signals X, Y which are obtained through the computation $X=X_c+x$, $Y=Y_c+y$. 19 represents a limiter circuit which is intended to preclude those data locating outside the effective observation area, since they cannot be used as imaging data. The output from this limiter circuit 19 is inputted to a X, Y oscilloscope 20 to thereby form a bright spot at a site corresponding to the position of the incident gamma ray, and thus a scintigram is recorded on the film of the camera 21.

The scintillation camera of the present invention is arranged so that the position of the window within the detector is not fixed but is movable, and that the movement of this window is such that the window is caused make a forward or a backward movement in the direction of scanning at such velocity that the sum of the movement velocity of the window and the actual movement velocity of the detector will always keep a predetermined scanning velocity of the detector. This movement of the window is controlled by a circuit 22 for computing the movement velocity of the window and by a circuit 23 for moving the window.

Figure 5A:
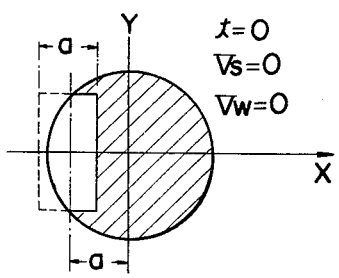
FIG. 5(a), FIG. 5(b), FIG. 5(c) and FIG. 5(d) are explanatory illustrations for explaining the movements of a window in the present invention.

Explanation will hereunder be made with respect to the behaviors of the window-moving means 22, 23 and also with respect to the shifting of the position of the window and its velocity of position shifting within the detector. In a conventional scintillation camera, the window has been fixed to a certain position within the range of detection, such as fixed at the center of the range of detection. In the present invention, however, it should be understood that at the moment a scanning is started, the window is moved within the detector only for a distance a in a direction opposite to the direction of scanning as shown in FIG. 5(a). It is the window-moving means 22, 23 and their peripheral circuits that serve to cause this movement of the window to be carried out automatically. For the simplicity of explanation, a predetermined velocity of movement of the detector, i.e. the predetermined scanning velocity, is represented by V, and the actual velocity of movement of the detector is represented by $V_s$, and the velocity of movement of the window is represented by $V_w$.

Figure 5B:
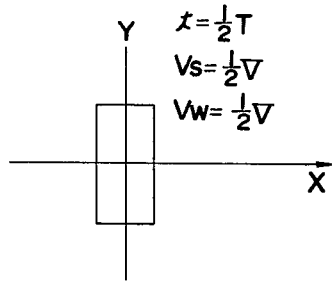
Figure 5C:
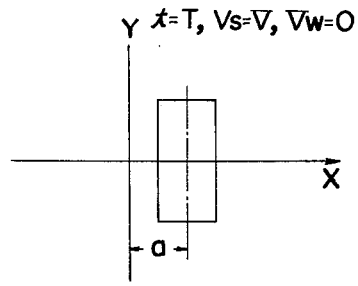
Figure 5D:
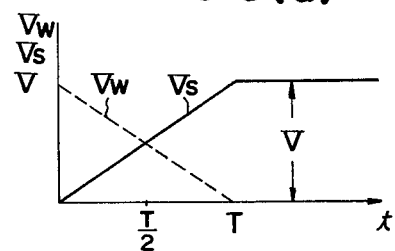

When a commanding signal to start scintigram photography is generated from the console 15 of the scintillation camera, there is generated a motor driving signal $V'_s$ from the scanning speed controlling circuit 16. Whereupon, the detector starts its movement while gradually increasing its speed from zero toward the predetermined scanning velocity V. FIG. 5(d) shows the variation of the actual velocity $V_s$ of movement the detector as such instance. This velocity $V_s$ of movement is detected as a velocity voltage by a velocity detector incorporated in the pedestal of the detector. This $V_s$ is transmitted to the circuit 22 for computing the velocity of movement of the window, in which is carried out a computation relative to the predetermined scanning velocity V:

$$V_w = V - V_s \qquad (2).$$

As a result, a voltage signal proportional to the velocity $V_w$ of movement of the window is transmitted to the window-moving circuit 23, in which is carried out a computation:

$$X_w = \int_o^t V_w \cdot dt \qquad (3).$$

Thus, the position of the window within the detector is shifted at the velocity $X_w$ in a direction opposite to the direction of scanning.

Variation of the movement velocity $V_w$ of the window during the above-stated operation is shown by broken line in FIG. 5(d). The velocity of movement of the window relative to the whole body imaging system will become constant, being $V_w + V_s = V$. At the time that the actual movement velocity $V_s$ of the window has been brought into agreement with the predetermined scanning velocity V, the velocity $V_w$ of movement of the window becomes $V_w = 0$, and thus the travelling window is brought to a halt.

At the time that the scanning is to be ceased, the operation of the window is carried out in a manner reverse of that for the starting of scanning. The velocity V of movement of the detector is gradually lowered toward zero, and along therewith the window is caused to move in the direction of scanning at a speed of $V - V_s$, and upon completion of scanning, the window is caused to move to the outside of the range of detection. It should be understood that FIG. 5(d) is shown to illustrate the instance wherein the actual scanning velocity $V_s$ of the detector varies rectilinearly. It is to be understood, however, that this $V_s$ does not necessarily need to vary rectilinearly so long as the condition $V = V_s + V_w$ is satisfied, and also so long as the condition $V_s = V$, by the time the window has moved up to the center of the detector, is satisfied. FIG. 5(a) shows the position of the window at the time a scanning is started, i.e. at $t = 0$, at which time $V_s = 0$ and $V_w = V$. FIG. 5(b) shows the state of the window at the time $t = \frac{1}{2}T$, at which time $V_s = \frac{1}{2}V$ and $V_w = \frac{1}{2}V$. FIG. 5(c) shows the state of the window at $t = T$, at which time $V_s = V$ and $V_w = 0$.

As will be understood from the foregoing description, the window will eventually cover the distance $D + 2a$ relative to the scanning area D of the detector, and this indicates that the effective observation area is $D + a$.

Figure 4:
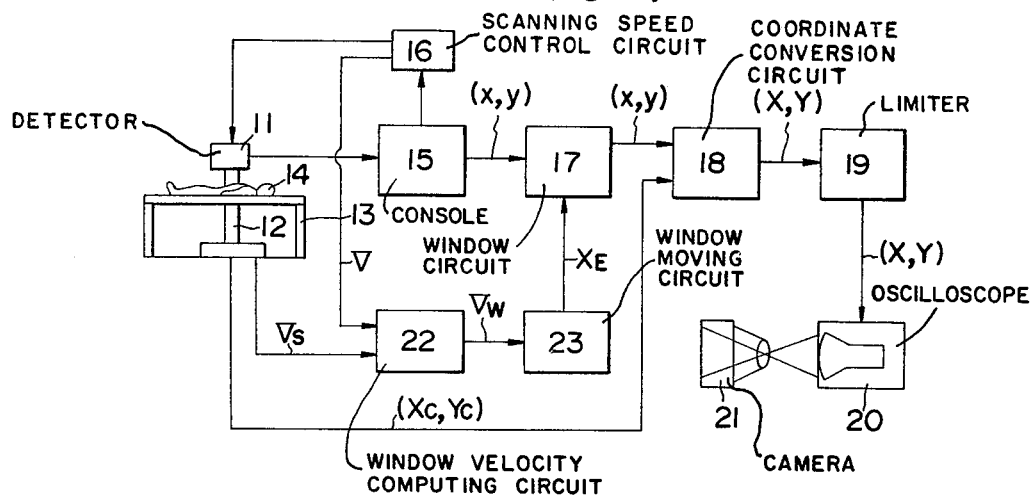
FIG. 4 is an explanatory block diagram for showing a typical arrangement of scanning type scintillation camera embodying the present invention.

The circuits of the window-moving system 22, 23 shown in FIG. 4 may be modified in a manner as shown in FIG. 6.

Equation (3) may be modified as follows.

$$X_w = \int_o^t V \cdot dt - \int_o^t V_s \cdot dt \qquad (4).$$

$$= \int_o^t V \cdot dt - X_c$$

Namely, the difference between the distance $$\int_o^t V \cdot dt$$

which is to be covered by the detector at a predetermined scanning velocity and the distance $X_c$ which is actually covered by the detector following the starting of scanning is the distance $X_w$ which is to be covered by the window itself relative to the detector.

In FIG. 6, 22' represents an integrator circuit which receives, as its input, a voltage proportional of the predetermined scanning velocity V, and starts integration upon starting of scanning. At the same time therewith, the detector will start its movement, and along therewith subtraction is carried out in a subtraction circuit 23' in which a voltage signal proportional to the distance $X_c$ covered by the detector is subtracted from the value of integration, and the window is caused to move within the detector for a distance corresponding to the resulting amount of voltage after said subtraction.

FIG. 7 is an illustration representing a more concrete circuit of FIG. 6. 31 represents a circuit for generating a predetermined voltage. 33 represents a circuit for controlling the speed of a motor 34. These two circuits 31 and 33 jointly constitute the scanning speed controlling circuit 16 shown in FIG. 4. The voltage V which is set by the predetermined voltage generating circuit 31 which, in turn, is formed by a potentiometer is transmitted by the scanning velocity control circuit 33. By a commanding signal to start scanning, which signal is generated by a circuit 32 for generating commanding signal to start scanning, the scanning velocity control circuit 33 will generate a signal $V_s$ for gradually raising the speed of the motor 34 from zero. Upon receipt of this signal $V_s$, the motor 34 will start rotation, thereby moving the detector. 35 represents means for generating pulse signals $P_x$ corresponding to the speed of rotation of the motor 34, and for example, said means may be a shaft encoder. These pulse signals $P_x$ are counted by a counter 38, and they are utilized as the positional signals $X_c$ for conversion to a whole body imaging coordinate system. On the other hand, the scanning starting signal delivered from the circuit 32 for generating a commanding signal to start scanning is transmitted at the same time to a pulse generator 36 also. The frequency of the pulses generated by this pulse generator 36 is proportional to the voltage V of the predetermined scanning velocity. These pulses V from the pulse generator 36 and those pulse signals $P_x$ which are outputted from the shaft encoder 35 are inputted to the count-up input terminal and to the count-down input terminal, respectively, of an up-down counter 37, and the difference between these two kinds of signals is outputted from this up-down counter 37 so that this output serves as the amount of travel $X_w$ of the window.

Description has been made with respect to an instance wherein the detector provided in a scanning type scintillation camera is moved. It is needless to say that the present invention is applicable also to a scanning type scintillation camera which is designed so that the bed carrying thereon a patient under study is caused to move in the X-axis direction relative to the detector.

As explained above, according to the present invention, it is possible to expand the effective observation area $D_{eff}$ from the conventional $X_E - 2a$ to $X_E$, and also the velocity of movement of the detector at the time a scanning is started may be raised gently, and moreover it is possible to simplify the mechanism of scanning. Still further, in case the actual velocity of scanning $V_s$ of the detector varies due to fluctuations at the power source or to changes in mechanical load, it is possible to automatically cause the position of the window to be moved back and forth in the direction of scanning in compliance with such variation in the actual velocity of scanning of the detector, and it is also possible to control so that the movement of the window is carried out at a constant speed throughout the entire scanning operation in spite of variation in the actual velocity of scanning of the detector, whereby stable precision observation through scanning at a constant speed can be obtained.

What is claimed is:

1. A scanning type scintillation camera arranged that bright spots of radiation are detected while moving the detector of the camera relative to the body of the subject under examination and that the positions of the bright spots noted in a first coordinate system set for the inherent range of detection of the camera are converted to a second coordinate system intended for imaging the whole body of the subject by adding them to or subtracting them from the distance covered by the detector, said scintillation camera further including means for shifting the position of a spatial "window" intended for limiting the detection range of the camera back and forth in the direction of scanning at such speed as will ensure the sum of the velocity of movement of this "window" and the velocity of actual scanning of the detector to always represent a predetermined scanning velocity of this detector.

* * * * *